United States Patent Office 2,860,950
Patented Nov. 18, 1958

2,860,950

METHOD OF PREPARING METAL HALIDES

Angus V. Henrickson, Boulder, Colo., assignor to the United States of America as represented by the United States Atomic Energy Commission No Drawing. Application December 21, 1955
Serial No. 554,593

4 Claims. (Cl. 23—14.5)

This invention relates to a process of converting peroxides of second rare earth series and, more particularly, plutonium peroxides to halides by dry conversion methods.

A process for converting plutonium peroxide to other plutonium compounds is highly desirable because the pure plutonium peroxide in aqueous slurry is an end product in one wet chemistry process of concentration and decontamination of plutonium made by neutron irradiation of uranium. The conversion processes are necessary to obtain other desirable compounds of plutonium. They are also desirable for the preparation of pure plutonium metal because, while the plutonium peroxide cannot itself be efficiently converted directly to the pure metal, a number of other compounds such as plutonium halides and especially plutonium tetrafluoride can be so converted. It may be seen that processes for efficiently converting the plutonium peroxide to other compounds are needed. The solution to the problem is especially important in plutonium chemistry, but is also of significance in the chemistry of all the metals of the second rare earth series.

An object, therefore of this invention is to provide a method for quickly and efficiently converting peroxides of second rare earth series metals to halides and related compounds of those metals.

A further object of this invention is to provide a method for rapidly and directly converting plutonium peroxide to plutonium halides, by the methods of dry chemistry.

Still further objects and advantages of this invention will appear in the following description.

The method of this invention produces plutonium tetrafluoride by direct hydrofluoriation of plutonium peroxide that has been purified after precipitation from an acid solution containing sulfate so that the tetrafluoride product is uniformly of fine-grained texture, has no tendency to form hard packed agglomerates, and which is ideally suitable otherwise for the reduction of plutonium metal.

It has been found that in order to prevent the formation of hard packed agglomerates in the conversion of the peroxide precipitated from acid solutions containing sulfate to the tetrafluoride it is necessary to remove water and any excess acid before the hydrofluorinating agent is added. The presence of water results in the product sticking together, while the presence of acid, which will become concentrated when heat is applied, results in a partial dissolving of the crystal surfaces to cause them to adhere. The acid can be removed by washing, and the water can be removed by a controlled drying procedure. Care must be exercised in the drying steps to prevent the decomposition of the plutonium peroxide with the formation of plutonium dioxide and plutonium sulfate because it is difficult to convert the plutonium in these compounds to plutonium tetrafluoride. It has been found by the inventor that plutonium peroxide is 0.75 percent decomposed per hour at 80° C., 10 percent decomposed per hour at 90° C. and 25 percent decomposed per hour at 102° C. The inventor has therefore found that drying can be conducted without prohibitive decomposition by drying at temperatures not in excess of 90° C.

The process of the invention is as follows:

The plutonium peroxide precipitate is prepared by precipitation from an acid solution with sulfate ion present. The presence of sulfate in the solution results in the formation of a dense granular precipitate. The plutonium peroxide is separated from the supernatant solution by filtration or decantation. It is then washed with a water solution of hydrogen peroxide either by decantation or on a filter until all the free acid has been removed. The plutonium peroxide precipitate is then dried at a temperature not greater than 90° C. to a point where the precipitate crumbles easily to a fine smooth powder. Drying can conveniently be done in the furnace to be used subsequently during the hydrofluorination cycle. It has been found that 80° C. is an especially satisfactory temperature. When the precipitate is dry, the temperature is increased and hydrofluoric acid and oxygen introduced at, or above, the boiling temperature of water, but before any significant decomposition of the plutonium peroxide has occurred. It has been found that 100° C. is a satisfactory temperature until the reaction rate stabilizes. Then the temperature is increased to 400 to 600° C. continuing the flow of gases and is held for the time necessary to complete the hydrofluorination. This time is a variable, dependent on the furnace design and the amount of contact afforded between the precipitate and gas.

The steps that are considered unique and essential to the process are:

(1) Washing of the precipitated plutonium peroxide to remove all free acid so that in the subsequent low temperature drying, concentration of the acid does not occur, resulting in surface deterioration of the plutonium peroxide precipitate.

(2) Drying of the plutonium peroxide precipitate at a temperature below its decomposition temperature to a point where the cake crumbles easily to a fine smooth powder.

(3) Introduction of the hydrofluoric acid in the hydrofluorination cycle at a temperature about the boiling temperature of water but before any significant decomposition of the plutonium peroxide has occurred.

Other methods of removing water without decomposition of the peroxide may conceivably be used. For example, water may be removed with a miscible organic solvent which boils below 80° C., such as ethyl alcohol. Ethyl alcohol has been tested and found successful. However, its inflammability introduces a hazard.

To illustrate the invention, the following example is given:

To about 320 grams of plutonium nitrate as a slurry in 0.8 liter of 4 normal nitric acid are added 3.2 liters of an acid mixture (0.4 M $MNO_3$ and 0.3 M $H_2SO_4$) to bring the volume to 4 liters. 200 cc. of 30 percent $H_2O_2$ are slowly added with agitation to the plutonium nitrate solution. When pre-reduction is completed as evidenced by a color change from blue to brown, the solution and precipitate are cooled to 15° C. and held at the temperature overnight. Enough 30% $H_2O_2$ is then added so that the concentration of $H_2O_2$ in the filtrate is about 9.0%. The peroxide should be added slowly to the solution for the first ten minutes.

The solution and precipitate are digested on a water bath for about 30 minutes, after which the mixture is cooled to 10° C. The solution is then poured through a sintered platinum or similar filter. The plutonium peroxide is washed on the filter with six 500 cc. portions of 6% $H_2O_2$, followed by two 250 cc. portions of pure ethyl alcohol. Air is then drawn through the filter cake on the metal filter for about 20 minutes.

About 320 grams of the plutonium peroxide is then placed in a furnace at about 80° C. through which is passed dry air at a rate of about fifty grams per hour for about 15 minutes. The air stream is then shut off and a dry stream of oxygen and of hydrogen fluoride, both at the rate of fifty grams per hour is passed over the peroxide meanwhile raising the temperature to about 100° C. After the plutonium peroxide and hydrogen fluoride reaction has stabilized, as indicated by a sharp rise in temperature, the hydrogen fluoride rate is increased to 300 grams per hour while maintaining the same rate in the oxygen stream and while holding the temperature at about 150° C. for about two hours. The streams are then kept at the same rate while the temperature is raised and held at 500 to 550° C. for about 3 hours. The furnace is shut off but the flow of gases is continued until the temperature of the resultant plutonium tetrafluoride falls to 300° C. The hydrogen fluoride flow is then cut off but the oxygen flow is continued at the rate of 150 grams per hour until the temperature falls to 270° C. The plutonium fluoride is then removed from the furnace and separated from the plutonium filter. A yield of about 98 percent chemical efficiency based on the plutonium is obtained.

All of the above described operations are performed in a dry box or through the use of remotely controlled equipment to reduce the hazard to personnel.

While the foregoing example has been directed to plutonium, the procedure may be applied to the preparation of fluorides from peroxides of uranium, neptunium, actinium, or any other metal of the second rare earth series.

What is claimed is:

1. The method of preparing plutonium halides from plutonium peroxide precipitates which comprises washing the peroxide precipitate with a water solution of hydrogen peroxide until all free acid has been removed, drying the peroxide at a temperature not greater than 90° C., promptly passing a dry gaseous hydrohalide over the surface of the peroxide at a temperature of about 100° C. until the reaction rate has stabilized, and then raising the reaction temperature to between 400° C. and 600° C. until the conversion to plutonium halide is substantially complete.

2. The method of claim 1 in which the hydrohalide is hydrogen fluoride.

3. The method of claim 1 in which the temperature for drying the peroxide is about 80° C.

4. The method of preparing plutonium tetrafluoride from plutonium peroxide precipitate which comprises washing the plutonium peroxide precipitate with a water solution of hydrogen peroxide until all free acid has been removed, drying the plutonium peroxide at a temperature of about 80° C., promptly passing dry gaseous hydrogen fluoride and oxygen over the surface of the plutonium peroxide at a temperature of about 100° C. until the reaction rate has stabilized, and then raising the reaction temperature to between 500° to 550° C. until the conversion to plutonium tetrafluoride is substantially complete.

References Cited in the file of this patent

Katz and Rabinowitch: The Chemistry of Uranium, NNES, VIII–5, pages 361, 399–400 (1951).

Seaborg, Katz and Manning: The Transuranium Elements, NNES, IV–14B (1949), page 1077.

Seaborg and Katz: The Actinide Elements, NNES IV–14A (1954), pages 376–378; 395–396.